United States Patent
Liu et al.

(10) Patent No.: US 12,002,242 B1
(45) Date of Patent: Jun. 4, 2024

(54) CIELAB COLOR SPACE-BASED QUANTITATIVE TESTING AND ANALYSIS METHOD FOR RICE SEED VIABILITY

(71) Applicant: Quality Standard and Testing Technology Research Institute, Yunnan Academy of Agricultural Sciences, Kunming (CN)

(72) Inventors: Yanfang Liu, Kunming (CN); Ruixi Han, Kunming (CN); Juxiang Qiao, Kunming (CN); Jiangchuan Fan, Kunming (CN); Changsheng Yin, Kunming (CN); Xiaohong Yang, Kunming (CN)

(73) Assignee: Quality Standard and Testing Technology Research Institute, Yunnan Academy of Agricultural Science, Kunming (CN)

( * ) Notice: Subject to any disclaimer, the term of this patent is extended or adjusted under 35 U.S.C. 154(b) by 0 days.

(21) Appl. No.: 18/422,159

(22) Filed: Jan. 25, 2024

(30) Foreign Application Priority Data

Aug. 25, 2023 (CN) .......................... 202311075552.4

(51) Int. Cl.
*G06T 7/90* (2017.01)
*A01C 1/02* (2006.01)
*G06T 7/00* (2017.01)
*H04N 23/84* (2023.01)
*A01G 22/22* (2018.01)

(52) U.S. Cl.
CPC ................ *G06T 7/90* (2017.01); *A01C 1/025* (2013.01); *G06T 7/0002* (2013.01); *H04N 23/84* (2023.01); *A01G 22/22* (2018.02); *G06T 2207/10012* (2013.01); *G06T 2207/10016* (2013.01); *G06T 2207/30188* (2013.01)

(58) Field of Classification Search
CPC ..................... G06T 7/90; G06T 7/0002; G06T 2207/10012; G06T 2207/10016; G06T 2207/30188; A01C 1/025
See application file for complete search history.

(56) References Cited

U.S. PATENT DOCUMENTS

2010/0233329 A1* 9/2010 Marno ................. G01N 21/359
426/231
2020/0027204 A1* 1/2020 Hadar ................ A01D 41/1278
(Continued)

*Primary Examiner* — Mohamed A. Wasel
(74) *Attorney, Agent, or Firm* — Jeenam Park

(57) ABSTRACT

The present invention discloses a CIELAB color space-based quantitative testing and analysis method for rice seed viability, and the method comprises removing husks on surfaces of rice seeds, soaking and imbibing the rice seeds without the husks removed, staining the rice seeds by using a TTC staining solution, and longitudinally cutting the rice seeds along embryos; converting the longitudinal section image of the rice seed from an RGB color space to a CIELAB color space, and calculating L value, a value and b value per unit area of the rice embryo as a staining intensity per unit area, and converting the staining intensity into a rice seed viability score according to a pre-established conversion model of the staining intensity and the rice seed viability score. According to the present invention, a reference result can be provided for the rapid, accurate and objective evaluation of the seed viability.

7 Claims, 2 Drawing Sheets

(56) References Cited

U.S. PATENT DOCUMENTS

2022/0053731 A1* 2/2022 Susin Arrieta ............ A01H 6/82
2022/0132736 A1* 5/2022 Meyers .............. A01D 41/1273
460/7

* cited by examiner

```
┌─────────────────────────────────────────────────────────────┐
│ Removing husks on surfaces of rice seeds, soaking and       │
│ imbibing the rice seeds without the husks removed, staining │─ S1
│ the rice seeds by using a TTC staining solution, and        │
│ longitudinally cutting the rice seeds along embryos         │
└─────────────────────────────────────────────────────────────┘
                              ▼
┌─────────────────────────────────────────────────────────────┐
│ Acquiring a longitudinal section image of the rice seed by  │─ S2
│ using a stereoscope                                         │
└─────────────────────────────────────────────────────────────┘
                              ▼
┌─────────────────────────────────────────────────────────────┐
│ Converting the longitudinal section image of the rice seed  │
│ from an RGB color space to a CIELAB color space, and        │─ S3
│ calculating L value, a value and b value per unit area of   │
│ the rice embryo as a staining intensity per unit area       │
└─────────────────────────────────────────────────────────────┘
                              ▼
┌─────────────────────────────────────────────────────────────┐
│ Converting the staining intensity into a rice seed          │
│ viability score according to a pre-established conversion   │─ S4
│ model of the staining intensity and the rice seed viability │
│ score                                                       │
└─────────────────────────────────────────────────────────────┘
```

FIG. 1

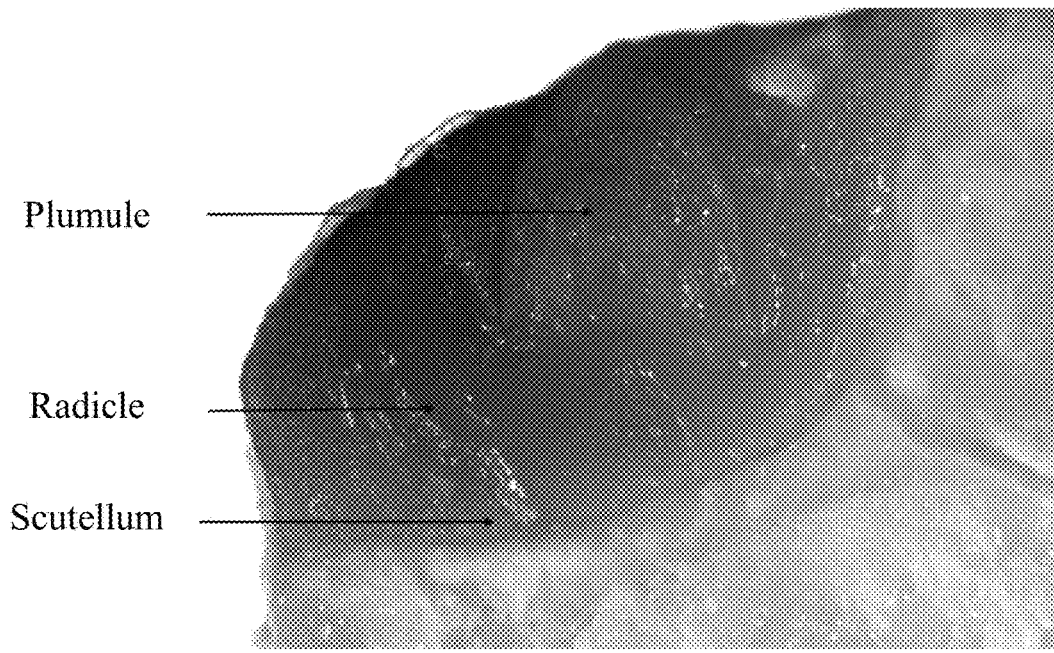

- Plumule
- Radicle
- Scutellum

FIG. 2

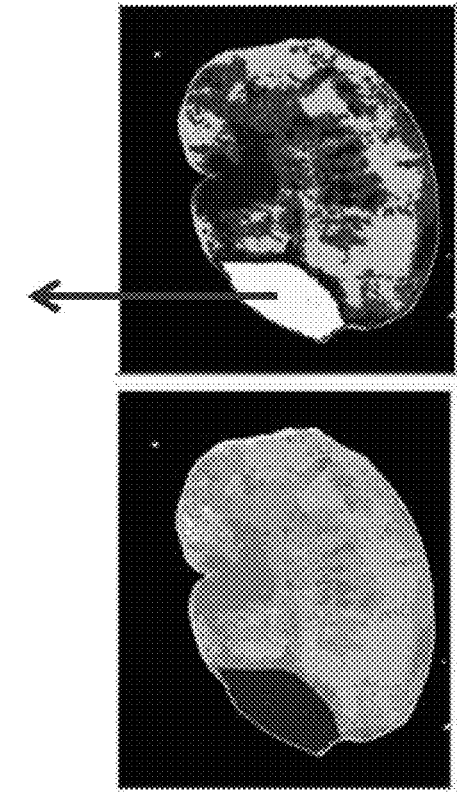
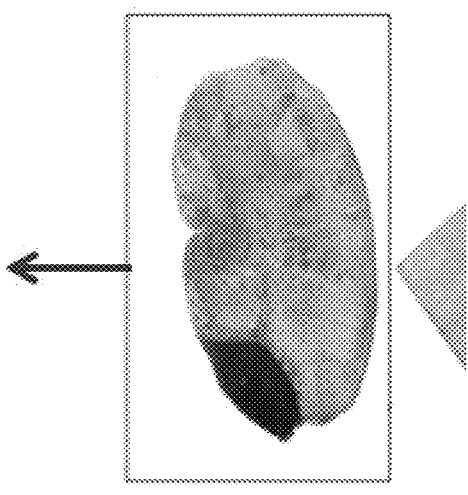
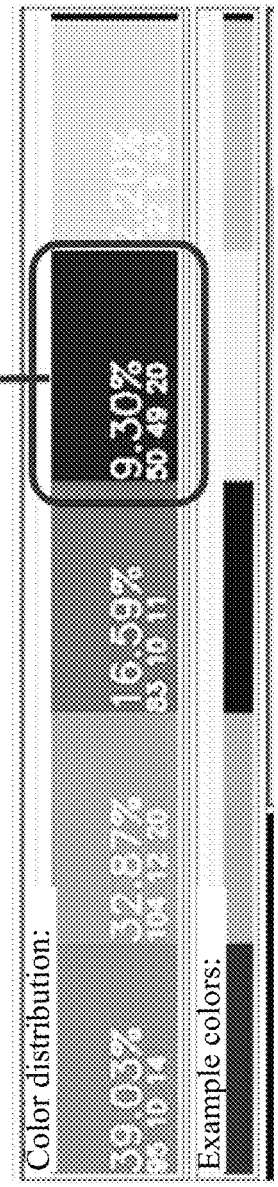
1. Framing a to-be-analyzed area
2. Marking the embryo area
3. The embryo area accounts for 9.3% of the total area; Lab values are 50, 49 and 20 respectively
FIG. 3

CIELAB COLOR SPACE-BASED QUANTITATIVE TESTING AND ANALYSIS METHOD FOR RICE SEED VIABILITY

CROSS-REFERENCE TO RELATED APPLICATIONS

This application claims priority to Chinese Patent Application No. 202311075552.4, filed on Aug. 25, 2023, which is hereby incorporated by reference in its entirety.

TECHNICAL FIELD

The present invention relates to the field of rice seed testing, and in particular, to a CIELAB color space-based quantitative testing and analysis method for rice seed viability.

BACKGROUND

Seed quality is determined by purity, germination rate, viability, moisture, and the like. Seed viability is one of the most important indicators of the seed quality, is closely related to field emergence, and is the basis of final yield and quality. At present, a method for testing the seed viability comprises a standard germination experiment, a conductivity measurement, a 2,3,5-triphenyltetrazolium chloride (TTC) staining experiment, and the like. Among them, TTC staining is a method for rapid testing of seed viability. The International Seed Testing Association (ISTA) and the Rules for the Inspection of Crop in China recommend TTC staining as one of the methods for testing seed viability. Generally, seeds with high vigor will also have high viability. The TTC staining method is an important basis for judging seed viability because of the advantages of rapidness, convenience, sensitivity, and the like.

In the seed quality testing, accurate and objective evaluation of seed viability is of great significance to the mechanized production of crops and ensuring food security. However, at present, the identification of seed viability by TTC staining is mainly observed by naked eyes of professional analysts, which is highly subjective; moreover, there are certain errors in the analysis results between different analysts, which can easily lead to reduced accuracy and repeatability.

Therefore, how to provide a method for testing rice seed viability with high accuracy is a technical problem that urgently needs to be solved.

SUMMARY

The present invention is mainly intended to provide a CIELAB color space-based quantitative testing and analysis method for rice seed viability, which aims to solve the problems that the identification of seed viability by TTC staining is mainly observed by naked eyes of professional analysts, subjectivity is high, and there are certain errors in the analysis results between different analysts, which can easily lead to reduced accuracy and repeatability.

In order to achieve the above objective, the present invention provides a CIELAB color space-based quantitative testing and analysis method for rice seed viability. The method comprises the following steps:

S1: removing husks on surfaces of rice seeds, soaking and imbibing the rice seeds without the husks removed, staining the rice seeds by using a TTC staining solution, and longitudinally cutting the rice seeds along embryos;

S2: acquiring a longitudinal section image of the rice seed by using a stereoscope;

S3: converting the longitudinal section image of the rice seed from an RGB color space to a CIELAB color space, and calculating L value, a value and b value per unit area of the rice embryo as a staining intensity per unit area, and S4: converting the staining intensity into a rice seed viability score according to a pre-established conversion model of the staining intensity and the rice seed viability score.

Optionally, the soaking and imbibing the rice seeds without the husks removed specifically comprises: placing the rice seeds with the husks removed in a sterilized glass bottle, adding sterile water to completely soak the seeds in the water, and placing the glass bottle in an incubator at 25° C. for seed soaking for about 16 h to ensure that the seeds are fully imbibed.

Optionally, the staining the rice seeds by using a TTC staining solution specifically comprises: after the seed soaking is completed, absorbing the water on surfaces of the seeds with a filter paper, staining the seeds at 30° C. for 3 h in the dark by using the TTC staining solution with a concentration of 1%, and then washing the seeds 2-3 times by using a PBS solution with a pH value of 7.0-7.4.

Optionally, the longitudinally cutting the rice seeds along embryos specifically comprises: cutting the seeds longitudinally along the embryos by a bistoury or a scalpel, and selecting a longitudinal cutting block of the rice seed with a complete embryo and endosperm for longitudinal section image acquisition.

Optionally, before the acquiring a longitudinal section image of the rice seed by using a stereoscope, the method further comprises: performing device calibration and parameter setting on the stereoscope, wherein the parameter setting comprises color mode selection, exposure time setting, photographing mode selection, magnification selection and top light and base light setting.

Optionally, the converting the longitudinal section image of the rice seed from an RGB color space to a CIELAB color space, and calculating L value, a value and b value per unit area of the rice embryo as a staining intensity per unit area specifically comprises:

extracting an RGB color value in the longitudinal section image of the rice seed;

establishing a least square polynomial regression relation between the RGB color value and the corresponding CIELAB value, and converting the RGB color space value of the image into CIELAB color space value;

determining an area of the rice embryo based on the longitudinal section image of the rice seed; and calculating the L value, a value and b value per unit area as the staining intensity per unit area according to the CIELAB value of the longitudinal section image of the rice seed and the area of the rice embryo.

Optionally, the method further specifically comprises:

dividing each batch of rice seeds in different batches of rice seeds into a testing group and an experimental group;

performing a standard germination experiment on the rice seeds in the experimental group, and determining rice seed viability scores of this batch of rice seeds according to a standard germination experiment result;

performing longitudinal cutting along the embryo, longitudinal section image acquisition and calculation of staining intensity per unit area on the rice seeds in the testing group; and fitting to obtain a relational expression between L values, a values and b values corresponding to the staining intensities and the rice seed viability scores based on the L values, a values and b values corresponding to the staining intensities of a plurality of groups of unit areas in the testing group.

Optionally, the different batches of rice seeds are configured such that the rice seed viability scores are uniformly distributed and a range interval meets a width requirement.

Optionally, the rice seed viability scores are germination rates of rice seeds of the same batch in the experimental group.

The present invention has the beneficial effects that: a CIELAB color space-based quantitative testing and analysis method for rice seed viability is provided, and the method comprises removing husks on surfaces of rice seeds, soaking and imbibing the rice seeds without the husks removed, staining the rice seeds by using a TTC staining solution, and longitudinally cutting the rice seeds along embryos; acquiring a longitudinal section image of the rice seed by using a stereoscope; converting the longitudinal section image of the rice seed from an RGB color space to a CIELAB color space, and calculating L value, a value and b value per unit area of the rice embryo as a staining intensity per unit area, and converting the staining intensity into a rice seed viability score according to a pre-established conversion model of the staining intensity and the rice seed viability score. According to the present invention, an image of the rice seed stained by the TTC staining solution is converted into a device-independent CIELAB color space from an RGB color space, and the L value, a value and b value per unit area of the rice embryo are used as the staining intensity per unit area, so that the rice seed viability is measured, and a reference result can be provided for the rapid, accurate and objective evaluation of the seed viability.

BRIEF DESCRIPTION OF DRAWINGS

FIG. 1 is a schematic flow chart of an embodiment of a CIELAB color space-based quantitative testing and analysis method for rice seed viability according to the present invention;

FIG. 2 is a schematic diagram of a longitudinal section of a rice seed embryo according to the present invention; and FIG. 3 is a schematic diagram showing an embryo area and Lab value obtained in the present invention.

The realization of the objectives, the functional features, and the advantages of the present invention will be further explained in conjunction with the embodiments and with reference to the drawings.

DESCRIPTION OF EMBODIMENTS

In order to make the objectives, technical solutions and advantages of the present invention more apparent, the present invention is further described in detail below with reference to the accompanying drawings and embodiments. It should be understood that the specific embodiments described herein are merely illustrative of the present invention and do not limit the present invention.

An embodiment of the present invention provides a CIELAB color space-based quantitative testing and analysis method for rice seed viability. Referring to FIG. 1, FIG. 1 is a schematic flow chart of an embodiment of a CIELAB color space-based quantitative testing and analysis method for rice seed viability according to the present invention.

In this embodiment, the CIELAB color space-based quantitative testing and analysis method for rice seed viability comprises the following steps:

S1: removing husks on surfaces of rice seeds, soaking and imbibing the rice seeds without the husks removed, staining the rice seeds by using a TTC staining solution, and longitudinally cutting the rice seeds along embryos;

S2: acquiring a longitudinal section image of the rice seed by using a stereoscope;

S3: converting the longitudinal section image of the rice seed from an RGB color space to a CIELAB color space, and calculating L value, a value and b value per unit area of the rice embryo as a staining intensity per unit area, and S4: converting the staining intensity into a rice seed viability score according to a pre-established conversion model of the staining intensity and the rice seed viability score.

In a preferred embodiment, the soaking and imbibing the rice seeds without the husks removed specifically comprises: placing the rice seeds with the husks removed in a sterilized glass bottle, adding sterile water to completely soak the seeds in the water, and placing the glass bottle in an incubator at 25° C. for seed soaking for about 16 h to ensure that the seeds are fully imbibed.

In a preferred embodiment, the staining the rice seeds by using a TTC staining solution specifically comprises: after the seed soaking is completed, absorbing the water on surfaces of the seeds with a filter paper, staining the seeds at 30° C. for 3 h in the dark by using the TTC staining solution with a concentration of 1%, and then washing the seeds 2-3 times by using a PBS solution with a pH value of 7.0-7.4.

In a preferred embodiment, the longitudinally cutting the rice seeds along embryos specifically comprises: cutting the seeds longitudinally along the embryos by a bistoury or a scalpel, and selecting a longitudinal cutting block of the rice seed with a complete embryo and endosperm for longitudinal section image acquisition.

In a preferred embodiment, before the acquiring a longitudinal section image of the rice seed by using a stereoscope, the method further comprises: performing device calibration and parameter setting on the stereoscope, wherein the parameter setting comprises color mode selection, exposure time setting, photographing mode selection, magnification selection and top light and base light setting.

In a preferred embodiment, the converting the longitudinal section image of the rice seed from an RGB color space to a CIELAB color space, and calculating L value, a value and b value per unit area of the rice embryo as a staining intensity per unit area specifically comprises: extracting an RGB color value in the longitudinal section image of the rice seed; establishing a least square polynomial regression relation between the RGB color value and the corresponding CIELAB value, and converting the RGB color space value of the image into CIELAB color space value; determining an area of the rice embryo based on the longitudinal section image of the rice seed; and calculating the L value, a value and b value per unit area as the staining intensity per unit area according to the CIELAB value of the longitudinal section image of the rice seed and the area of the rice embryo.

In a preferred embodiment, the method further specifically comprises: dividing each batch of rice seeds in different batches of rice seeds into a testing group and an experimental group; performing a standard germination experiment on the rice seeds in the experimental group, and determining rice seed viability scores of this batch of rice seeds according to a standard germination experiment result; performing longitudinal cutting along the embryo, longitudinal section image acquisition and calculation of staining intensity per unit area on the rice seeds in the testing group; and fitting to obtain a relational expression between L values, a values and b values corresponding to the staining intensities and the rice seed viability scores based on the L values, a values and b values corresponding to the staining intensities of a plurality of groups of unit areas in the testing group.

In a preferred embodiment, the different batches of rice seeds are configured such that the rice seed viability scores are uniformly distributed and a range interval meets a width requirement.

In a preferred embodiment, the rice seed viability scores are germination rates of rice seeds of the same batch in the experimental group.

In this embodiment, a CIELAB color space-based quantitative testing and analysis method for rice seed viability is provided, in which an image of rice seeds stained by the TTC staining solution is converted into a device-independent CIELAB color space from an RGB color space, and the L value, a value and b value per unit area of the rice embryo are used as the staining intensity per unit area, so that the rice seed viability is measured, and a reference result can be provided for the rapid, accurate and objective evaluation of the seed viability.

In order to explain the present application more clearly, the following provides a specific example of the CIELAB color space-based quantitative testing and analysis method for rice seed viability of the present application:

(1) Testing of Rice Seed Viability by Using TTC Staining

Husk removal: removing husks on the surface of rice seeds using a husk remover or manually (be careful not to damage the embryo).

Seed soaking: placing the rice seeds with the husks removed in a small sterilized glass bottle, adding appropriate amount of sterile water to completely soak the seeds in the water, and placing the glass bottle in an incubator at 25° C. for seed soaking for about 16 h to ensure that the seeds are fully imbibed.

Staining: after the seed soaking is completed, absorbing water on the surfaces of the seeds with a filter paper, staining at 30° C. for 3 h in the dark by using TTC (prepared by PBS with pH 7.0-7.4) staining solution with a concentration of 1%, washing the seeds 2-3 times by using a PBS solution (pH 7.0-7.4), cutting the seeds longitudinally along the embryos by a bistoury or a scalpel, selecting a block with a complete embryo structure (comprising complete embryo and endosperm) as shown in FIG. 2, and observing and counting the staining condition of the embryos to evaluate the seed viability.

(2) Quantitative Analysis of Seed Viability Using CIELAB Color Space

Image acquisition: in a room with relatively consistent and stable ambient light, acquiring a seed longitudinal section picture by using a stereoscope (Leica, M205FC) image acquisition system. Requirements: before image acquisition, according to system prompts, clicking a corresponding button for automatically calibrating a device; after the calibration is passed, performing parameter setting (a color mode is selected, the exposure time is 6.14 ms, a default camera is selected, the image magnification is 10×, and the top and base lights are 100% and 60% respectively); and completing the operations to acquire the image. (Other image acquisition devices can be used to acquire seed images, and since the seeds are small and the images are susceptible to light, it is necessary to ensure the clarity of the photographed image and the relative consistency of the light source at the photographing location.)

Image analysis: performing image analysis by using image processing or analysis software such as photoshop and OpenCV. The non-linear operation is performed with an XYZ color space, the RGB color space is firstly converted into the XYZ color space, then conversion is performed through a regression relation between the XYZ color space and a CIELAB color space, and finally, the image RGB color space value is converted to CIELAB color space value, as shown in FIG. 3. After the conversion is completed, the staining intensity per unit area, i.e., the L value, a value and b value per unit area of the embryo part, is calculated. And then, the staining intensity is converted into a rice seed viability score according to the staining intensity and a pre-established conversion model of the staining intensity and the rice seed viability score to obtain a quantitative testing and analysis result for rice seed viability.

In another specific example, a method for establishing a conversion model between staining intensity and rice seed viability score is provided. Specifically, this method comprises: dividing each batch of rice seeds in different batches of rice seeds into a testing group and an experimental group; performing a standard germination experiment on the rice seeds in the experimental group, and determining rice seed viability scores of this batch of rice seeds according to a standard germination experiment result; performing longitudinal cutting along the embryo, longitudinal section image acquisition and calculation of staining intensity per unit area on the rice seeds in the testing group; and fitting to obtain a relational expression between L values, a values and b values corresponding to the staining intensities and the rice seed viability scores based on the L values, a values and b values corresponding to the staining intensities of a plurality of groups of unit areas in the testing group.

Therefore, a relational expression between L values, a values and b values corresponding to the staining intensities and the rice seed viability scores is obtained through fitting, the quantitative rice seed viability scores corresponding to the different measured L values, a values and b values can be solved, and the condition that the rice seed viability scores with the same L value, a value and b value cannot be matched for a test group due to the small data quantity of the experimental group is avoided through fitting the expression relation in this specific example. It should be noted that the different batches of rice seeds are configured such that the rice seed viability scores are uniformly distributed and a range interval meets a width requirement, so as to ensure the accuracy of the fitting expression relation.

It should be understood that, in the description of this specification, the description with reference to the terms "one embodiment", "another embodiment", "other embodiments", "first embodiment to Nth embodiment", or the like means the particular features, structures, materials or characteristics described in combination with the embodiment or example are included in at least one embodiment or example of the present invention. In this specification, the schematic expression of the above terms does not necessarily refer to the same embodiments or examples. Furthermore, the specific features, structures, materials, or characteristics described can be combined in any suitable manner in any one or more embodiments or examples.

It should be noted that terms "include", "comprise", or any other variants thereof used herein are intended to cover a non-exclusive inclusion, so that a process, a method, an article or a system that includes a list of elements includes those elements, and also includes other elements which are not expressly listed, or further includes elements inherent to this process, method, article or system. Without further limitation, an element defined by the phrase "including a/an . . . " does not exclude the presence of another identical elements in the process, method, article or system that includes the element.

The above mentioned contents are merely preferred embodiments of the present invention and are not intended to limit the patent scope of the present invention. The equivalent structure or equivalent process transformation made by using the contents of the specification and the drawings of the present invention, or direct or indirect applications to other related technical fields, are all included in the patent protection scope of the present invention.

What is claimed is:

1. A CIELAB color space-based quantitative testing and analysis method for rice seed viability, comprising the following steps:
    S1: removing husks on surfaces of rice seeds, soaking and imbibing the rice seeds without the husks removed, staining the rice seeds by using a TTC staining solution, and longitudinally cutting the rice seeds along embryos;
    S2: acquiring a longitudinal section image of the rice seed by using a stereoscope;
    S3: converting the longitudinal section image of the rice seed from an RGB color space to a CIELAB color space, and calculating L value, a value and b value per unit area of the rice embryo as a staining intensity per unit area, comprising the following steps:
    extracting an RGB color value in the longitudinal section image of the rice seed;
    establishing a least square polynomial regression relation between the RGB color value and the corresponding CIELAB value, and converting the RGB color space value of the image into CIELAB color space value;
    determining an area of the rice embryo based on the longitudinal section image of the rice seed;
    calculating the L value, a value and b value per unit area as the staining intensity per unit area according to the CIELAB value of the longitudinal section image of the rice seed and the area of the rice embryo;
    dividing each batch of rice seeds in different batches of rice seeds into a testing group and an experimental group;
    performing a standard germination experiment on the rice seeds in the experimental group, and determining rice seed viability scores of this batch of rice seeds according to a standard germination experiment result;
    performing longitudinal cutting along the embryo, longitudinal section image acquisition and calculation of staining intensity per unit area on the rice seeds in the testing group;
    fitting to obtain a relational expression between L values, a values and b values corresponding to the staining intensities and the rice seed viability scores based on the L values, a values and b values corresponding to the staining intensities of a plurality of groups of unit areas in the testing group; and
    S4: converting the staining intensity into a rice seed viability score according to a pre-established conversion model of the staining intensity and the rice seed viability score.

2. The CIELAB color space-based quantitative testing and analysis method for rice seed viability according to claim 1, wherein the soaking and imbibing the rice seeds without the husks removed comprises the following steps: placing the rice seeds with the husks removed in a sterilized glass bottle, adding sterile water to completely soak the seeds in the water, and placing the glass bottle in an incubator at 25° C. for seed soaking for about 16 h to ensure that the seeds are fully imbibed.

3. The CIELAB color space-based quantitative testing and analysis method for rice seed viability according to claim 2, wherein the staining the rice seeds by using a TTC staining solution comprises the following steps: after the seed soaking is completed, absorbing the water on surfaces of the seeds with a filter paper, staining the seeds at 30° C. for 3 h in the dark by using the TTC staining solution with a concentration of 1%, and then washing the seeds 2-3 times by using a PBS solution with a pH value of 7.0-7.4.

4. The CIELAB color space-based quantitative testing and analysis method for rice seed viability according to claim 1, wherein the longitudinally cutting the rice seeds along embryos comprises the following steps: cutting the seeds longitudinally along the embryos by a bistoury or a scalpel, and selecting a longitudinal cutting block of the rice seed with a complete embryo and endosperm for longitudinal section image acquisition.

5. The CIELAB color space-based quantitative testing and analysis method for rice seed viability according to claim 1, before the acquiring a longitudinal section image of the rice seed by using a stereoscope, further comprising the following steps: performing device calibration and parameter setting on the stereoscope, wherein the parameter setting comprises color mode selection, exposure time setting, photographing mode selection, magnification selection and top light and base light setting.

6. The CIELAB color space-based quantitative testing and analysis method for rice seed viability according to claim 1, wherein the different batches of rice seeds are configured such that the rice seed viability scores are uniformly distributed and a range interval meets a width requirement.

7. The CIELAB color space-based quantitative testing and analysis method for rice seed viability according to claim 1, wherein the rice seed viability scores are germination rates of rice seeds of the same batch in the experimental group.

* * * * *